United States Patent
Majjiga et al.

(10) Patent No.: US 12,156,049 B2
(45) Date of Patent: *Nov. 26, 2024

(54) NETWORK-DRIVEN, LOCATION-AWARE, DYNAMIC SLICE MANAGEMENT FOR DRONES

(71) Applicant: Verizon Patent and Licensing Inc., Basking Ridge, NJ (US)

(72) Inventors: Deepak Majjiga, Tirupati West (IN); Sabareeswar P. Balakrishnan, Chennai (IN); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,168

(22) Filed: Dec. 12, 2023

(65) Prior Publication Data

US 2024/0114361 A1    Apr. 4, 2024

Related U.S. Application Data

(63) Continuation of application No. 17/375,212, filed on Jul. 14, 2021, now Pat. No. 11,877,162.

(30) Foreign Application Priority Data

May 31, 2021    (IN) .............................. 202141024141

(51) Int. Cl.
H04W 24/02    (2009.01)
G08G 5/00    (2006.01)

(52) U.S. Cl.
CPC .......... *H04W 24/02* (2013.01); *G08G 5/0013* (2013.01)

(58) Field of Classification Search
CPC ............................ H04W 24/02; G08G 5/0013
USPC ......................................................... 370/254
See application file for complete search history.

(56) References Cited

U.S. PATENT DOCUMENTS

| | | |
|---|---|---|
| 2017/0083979 A1 | 3/2017 | Winn et al. |
| 2022/0046528 A1 | 2/2022 | Yang et al. |
| 2022/0051577 A1 | 2/2022 | Ali et al. |

FOREIGN PATENT DOCUMENTS

WO    2021/046026    3/2021

*Primary Examiner* — Gbemileke J Onamuti

(57) ABSTRACT

A method and system is described that performs dynamic slice management for unmanned aerial vehicles (UAVs). Flight path information associated with a flight path of a UAV is used to determine a predicted optimal application and a predicted optimal network slice for use by the UAV at a location along the flight path. Information associated with the predicted optimal application and the predicted optimal network slice is transmitted to the UAV for use by the UAV at the location. The available network slices to the UAV may be updated based on the determined predicted optimal slice. The UAV may adjust its usage of applications and/or slices based on the information it receives associated with the predicted optimal application and the predicted optimal network slice.

20 Claims, 7 Drawing Sheets

```
'flight_plan': {
    'takeoff_latitude': 33.85985651142862,
    'takeoff_longitude': -118.37090675317283,
    'pilot_id': None,
    'start_time': 'now',
    'end_time': 'now',
    'max_altitude_agl': 100,
    'buffer': 2,
    'geometry': {'type': 'polygon',
        'coordinates': [[
            [-118.37090675317283, 33.85985651142862],
            [-118.37305689960727, 33.85502978214579],
            [-118.37347984313863, 33.85467738101549],
            [-118.37286141853333, 33.85331326221667],
            [-118.37103489074707, 33.85174201755203],
            [-118.36997151374815, 33.85178874785573],
            [-118.36995005607605, 33.85281123217s4],
            [-118.37090675317283, 33.85985651142862]
        ]]
    }
}
```

| Predicted Time Period | Predicted Location | Predicted Application / Slice Pair |
|---|---|---|
| Period 1 | TAI-1 | {App-1, S-NSSAI-1}, {App-2, S-NSSAI-2} |
| Period 2 | TAI-2 | {App-3, S-NSSAI-3}, {App-4, S-NSSAI-4} |

| Predicted Time Period | Predicted Location | Subscribed NSSAIs | Current Allowed NSSAIs | Predicted NSSAIs | Missing Optimal NSSAIs | Target Allowed NSSAIs |
|---|---|---|---|---|---|---|
| Period 1 | TAI-1 | S-NSSAI-1, S-NSSAI-2, S-NSSAI-3, S-NSSAI-4, S-NSSAI-5 | S-NSSAI-1, S-NSSAI-3 | S-NSSAI-1, S-NSSAI-2, S-NSSAI-6 | S-NSSAI-2 | S-NSSAI-1, S-NSSAI-2, S-NSSAI-3 |
| Period 2 | TAI-2 | S-NSSAI-1, S-NSSAI-2, S-NSSAI-3, S-NSSAI-4, S-NSSAI-5 | S-NSSAI-1, S-NSSAI-2 | S-NSSAI-4, S-NSSAI-6, S-NSSAI-7 | S-NSSAI-4 | S-NSSAI-1, S-NSSAI-2, S-NSSAI-4 |
| Period 3 | TAI-3 | S-NSSAI-1, S-NSSAI-2, S-NSSAI-3, S-NSSAI-4 | S-NSSAI-1, S-NSSAI-2, S-NSSAI-3, S-NSSAI-4 | S-NSSAI-5 | (NONE) | S-NSSAI-1, S-NSSAI-2, S-NSSAI-3, S-NSSAI-4 |

FIG. 4B

ABSTRACT# NETWORK-DRIVEN, LOCATION-AWARE, DYNAMIC SLICE MANAGEMENT FOR DRONES

CROSS-REFERENCE TO RELATED APPLICATIONS

This application is a continuation of co-pending U.S. patent application Ser. No. 17/375,212, filed on Jul. 14, 2021, which claims the priority benefit of Indian Provisional Application No. 202141024141, filed May 31, 2021, the disclosures of which are hereby incorporated by reference in their entirety.

BACKGROUND INFORMATION

The use of Unmanned Aerial Vehicles (UAVs), also referred to as drones, is increasing. It is anticipated that drones may fly over large distances and be operated by a controller over a cellular network. In addition, drones may collect data and send the data back to the controller over the cellular network and other data networks. For example, a UAV may execute one or more applications that consume or generate data, where such data is communicated over the cellular network. Technologies such as network slicing have been proposed for use in Fifth Generation (5G) networks, however the application of network slicing to the requirements of UAVs in flight has been limited. As an example, a UAV may have multiple requirements depending on the purpose of the flight, the type of application and/or, the drone operator, and these requirements may change over the course of a flight (for example, based on the drone's location or mission).

BRIEF DESCRIPTION OF THE DRAWINGS

FIG. 3C is an illustration of example flight path information in accordance with an example implementation;

FIGS. 4A and 4B illustrate example slice predictions in accordance with an example implementation.

DETAILED DESCRIPTION OF EXAMPLE EMBODIMENTS

Figure 1:
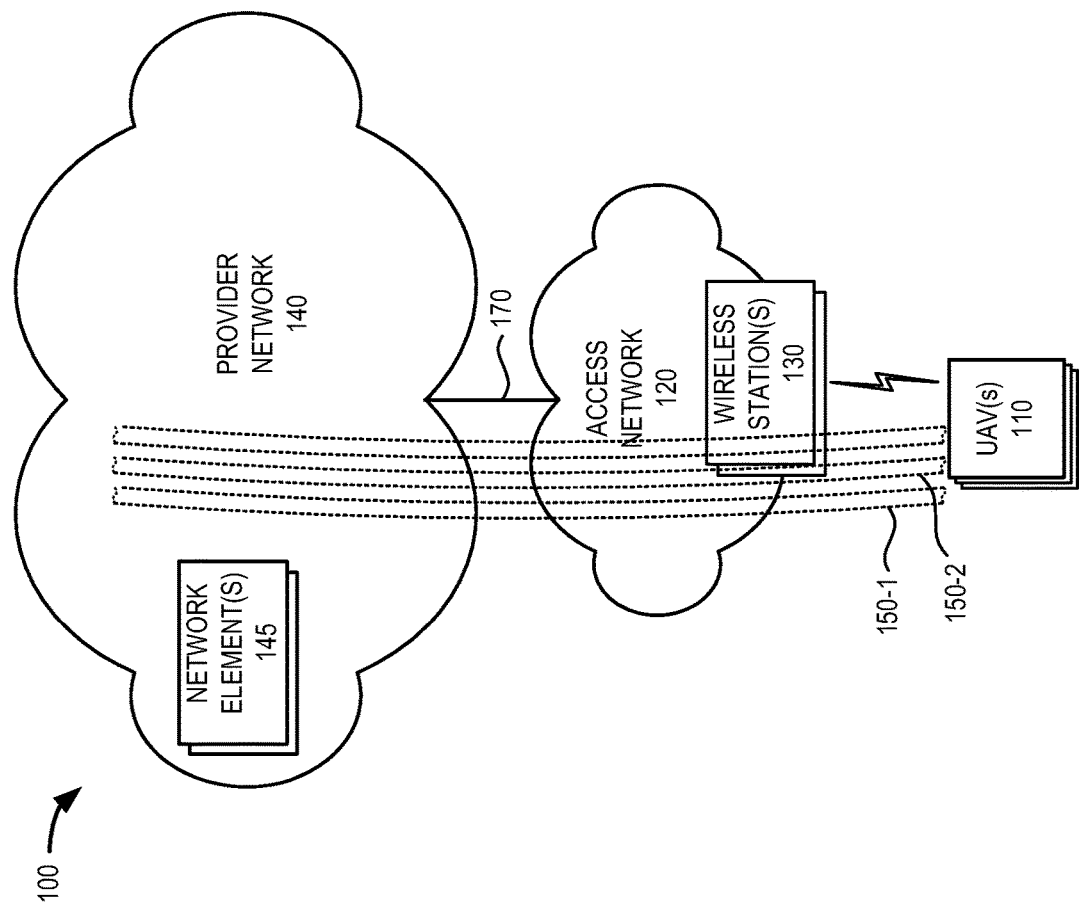
FIG. 1 illustrates an example environment in which systems and methods described herein may be implemented.

The following detailed description refers to the accompanying drawings. The same reference numbers in different drawings may identify the same or similar elements.

Drones generally require communications capabilities in order to transmit and receive data while in flight. As just two examples, drones may be used to collect data from onboard sensors (which may include telemetry information about the operation of the drone) and transmit the data collected to a ground platform such as a ground control station (GCS), and drones may receive control signals from a control system such as a GCS in order to control its operation. In some situations, a drone may include short range wireless communication capability (e.g., Wi-Fi) to communicate with the controller via unlicensed frequency bands. However, the range of the short range wireless communication may be limited. Many advanced drone operations may extend beyond the limitations of short range wireless communication. For example, drone operations may support so-called "beyond visual line-of-sight" (BVLOS) operations where the drone operator cannot see the drone and controls the drone through onboard sensor information (e.g., cameras, telemetry data, etc.). Therefore, drone operators may need to fly drones using a wide area wireless network (such as a cellular network) to provide communications services.

With the advances in UAV technology, more and more drones are expected to have an onboard capabilities for cellular connectivity. At the same time, 5G networks are also being deployed for nationwide coverage in many countries. 5G networks have been architected to provide for various networking capabilities, such as lower communications latency, greater throughput, greater connection counts, higher connection reliability, etc. In addition, 5G networks are being designed to provide support for network slicing, which allows for network-connected devices to experience network capabilities that are tailored for their uses—for example, one network slice can specify high throughput to accommodate applications that require high bandwidth communications (e.g., live video feeds), while another network slice can specify high reliability and low latency to accommodate applications that require quick responsiveness and "always-on" connectivity (e.g., remote control signaling).

Drones may be expected to use one or more applications during the course of a flight. As some examples, a drone can use a control application that allows the drone to receive "command and control" messaging and transmit telemetry information with a ground-based control system, a monitoring application that allows the drone to transmit data from onboard sensors to a ground-based monitoring system, and a video application that allows for video captured by an onboard camera to be streamed to a ground-based video processing system. As with ground-based devices, drones can take advantage of the benefits of slicing capabilities of a 5G network to enhance the experience of the applications used. However, the in-flight nature of the drone environment presents additional challenges to using network slicing with drone applications.

During a single flight, it may be desirable for a drone to use more than one network slice. For example, for command and control purposes, a drone may need to use an ultra-reliable low-latency communications (URLLC) slice. However, for defensive purposes, the drone may need to access a "mission critical" application during the same flight to avoid obstacles. For example, the drone may need to use a camera/video application to perform real-time video processing to detect obstacles during the flight, such as buildings, birds, and other aerial and terrestrial vehicles. For such a mission critical application, the drone may use a massive Machine Type Communication (mMTC) slice. In addition, it may be useful for a drone to switch slices in flight. For example, for live streaming from a drone camera, in some geographical locations or operational contexts (e.g., rural areas, low-traffic areas, high-speed operations), low-definition video may be sufficient, and a slice that provides standard best-efforts service may be used. However, for other geographical locations or operational contexts (e.g., urban areas, high traffic areas, low-speed operations), high definition (HD) video may be desirable, and an enhanced mobile broadband (eMBB) slice that provides high bandwidth may be required. Accordingly, slice requirements may change over the course of the flight and may depend on, for example, the drone's location and trajectory and which applications are used by the drone during the course of the flight (and when they are used).

Another issue of particular concern to UAV operations is whether a desired slice is available over the entire geographic area of the flight. For example, a slice desirable for an application used by the drone may not be supported in an area in which the UAV is traveling. Without insight into the slices available from the 5G network over the geographic territory of flight, UAVs may be constrained to which slices can be used by applications during a flight. In other situations, the UAV may be constrained to using the same slice for a given application throughout a flight plan, which may not be optimal as noted above.

Implementations described herein may dynamically manage network slices available to and used by a UAV during the course of a flight. For example, capabilities may be added to 5G network functions to implement dynamic slice management for UAVs. In an example embodiment, a Network Data Analytics Function (NWDAF) may be implemented to predict optimal network slices for use by a UAV based on applications, location, time, and/or service experience. In addition, an Access and Mobility Management Function (AMF) may be implemented to identify slices available to a UAV in a geographic area and/or time period, and update the available slices with the predicted optimal slices from the NWDAF to determine new allowed network slices. An Application Function (AF) may be implemented to notify the UAV about the optimal usage of applications and/or slices, for example, when the UAV reaches the next geographic area in its flight plan.

The implementations described herein allow for dynamic slice management of a UAV over a flight path, so that the network can provide support for a desired application at a location based on the needs of the UAV and the applications being used by the UAV. Accordingly, implementations described herein may provide for an optimal application service experience by the UAV at any given location over the complete flight path.

FIG. 1 is a diagram illustrating concepts described herein. As shown in FIG. 1, an environment 100 may include one or more UAVs 110, an access network 120, one or more wireless stations 130, and a provider network 140. Each UAV 110 may connect to provider network 140 via access network 120 and use one of multiple available network slices 150 (e.g., slice 150-1, 150-2, etc.).

UAV 110 may include an aircraft (e.g., a single rotor aircraft, multirotor aircraft or fixed wing aircraft) that receives control signals from a controller. In some implementations, UAV 110 may include cellular communication capability (e.g., 5G communication capability, etc.) to allow UAV 110 to receive commands from a remotely located GCS and/or a short range wireless communication capability (e.g., Wi-Fi) to allow UAV 110 to receive commands from a GCS located relatively close to UAV 110.

According to example implementations described herein, UAV 110 may be configured to use one or more applications or services that are optimally supported by a specific type of network slice 150. For example, a particular network slice may be optimally configured for a particular type of traffic initiated/required by UAV 110, such as command and control data, mission critical data (e.g., data from an application capturing and processing real-time video data to detect obstacles such as birds, buildings, other drones, etc., and re-direct the drone to avoid collisions), telemetry data, image data, video streaming, designated emergency data, etc.

Access network 120 may provide access to provider network 140 for wireless-enabled devices, such as UAV 110. Access network 120 may enable UAV 110 to connect to provider network 140 for Internet access, non-Internet Protocol (IP) data delivery, cloud computing, mobile telephone service, command and control service, telemetry data transmission, and/or other types of data services. Access network 120 may include wireless stations 130, and UAVs 110 may wirelessly communicate with access network 120 via one or more wireless stations 130. Access network 120 may establish a packet data network connection between UAV 110 and provider network 140. In some implementations, access network 120 may provide access to a service or application layer network, a cloud network, a multi-access edge computing (MEC) network, a fog network, and so forth. Furthermore, access network 120 may enable a server device to exchange data with UAV 110 using a non-IP data delivery method such as Data over Non-Access Stratum (DoNAS).

Access network 120 may include a 5G Radio Access Network (RAN), such as a 5G New Radio access network or another advanced network that supports network slicing. Additionally, access network 120 may include functionality such as sub-6 GHz and/or mm-wave transmission frequencies; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; Machine Type Communication (MTC) functionality, such as 1.4 MHz wide enhanced MTC (eMTC) channels (also referred to as category Cat-M1), Low Power Wide Area (LPWA) technology such as Narrow Band (NB) Internet of Things (IoT) (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UAV 110 to wirelessly connect to access network 120. Wireless station 130 may correspond to a macrocell or to a small cell (e.g., a femtocell, a picocell, a microcell, etc.), and may constitute multiple components implemented over an area (e.g., central units, distributed units, radio units, antennas). In other implementations, wireless station 130 may include another type of base station for another type of wireless network that supports network slicing. Wireless station 130 may support or be associated with one or more network slices 150. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or an LTE network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UAV 110, and may interface with other external networks, such as private IP networks and public IP networks.

According to one implementation, provider network 140 may provide a core network for one or multiple access networks 120. For example, provider network 140 may include core network portions of a 5G network. Depending on the implementation, provider network 140 may include various network elements 145, such as a gateway, a support node, a serving node, a router, a switch, a bridge, as well as other network elements pertaining to various network-related functions, such as billing, security, authentication and authorization, network policies, subscriber profiles, etc. Further descriptions of example network elements and network-related functions is provided below in reference to FIGS. 3A and 3B.

Network slices 150 may be considered a virtualized network implemented using the facilities of a network (e.g., access network 120, provider network 140) and may be configured with different characteristics (e.g., latency, bandwidth, jitter, device density, energy efficiency, mobility, etc.) to support different types of applications and/or services, such as URLLC services, video streaming, massive IoT traffic, autonomous driving, etc.

Although FIG. 1 shows exemplary components of environment 100, in other implementations, environment 100 may include fewer components, different components, differently arranged components, or additional functional components than depicted in FIG. 1. For example, in one implementation, environment 100 may include a MEC facility that provides applications and services at the edge of a network, such as access network 120 or provider network 140. Additionally or alternatively, one or more components of environment 100 may perform functions described as being performed by one or more other components of environment 100.

Figure 2:
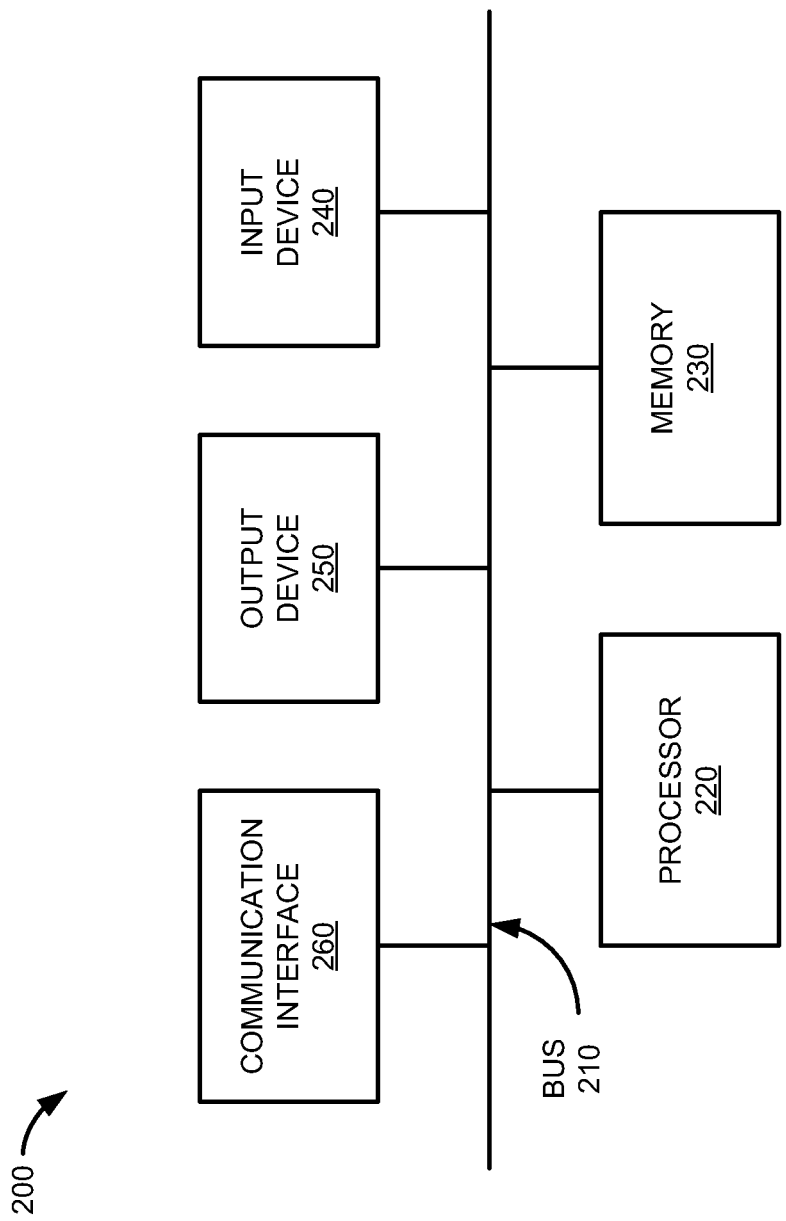
FIG. 2 is a block diagram of components implemented in one or more of the elements of the environment of FIG. 1 in accordance with an example implementation.

FIG. 2 illustrates an exemplary configuration of a device 200. One or more devices 200 may correspond to or be included in UAV 110, wireless stations 130, network elements 145, or other devices in environment 100. Referring to FIG. 2, device 200 may include bus 210, processor 220, memory 230, one or more input devices 240, one or more output devices 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input devices 240 may include a mechanism that permits the device 200 to collect input information, such as a keypad, a keyboard, a mouse, a pen, a microphone, a touch screen, voice recognition and/or biometric mechanisms, etc. A device such as a UAV 110 may include input devices 240 such as sensor devices (e.g., electromagnetic sensors such as visual/infrared/ultraviolet cameras, environmental sensors such as thermal sensors and acoustic sensors, motion sensors, etc.). Output devices 250 may include a mechanism that permits device 200 to output information, including a display (e.g., a liquid crystal display (LCD)), a speaker, etc. In some implementations, device 200 may include a touch screen display may act as both an input device 240 and an output device 250. In some implementations, device 200 may not include an input device 240 and/or an output device 250, and may instead collect input information and/or provide output information through communications interface 260.

Communication interface 260 may include one or more transceivers that device 200 may use to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for clarity. It should be understood that device 200 may include more or fewer components than illustrated in FIG. 2. For example, for device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110, as well as a battery to power UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3A:
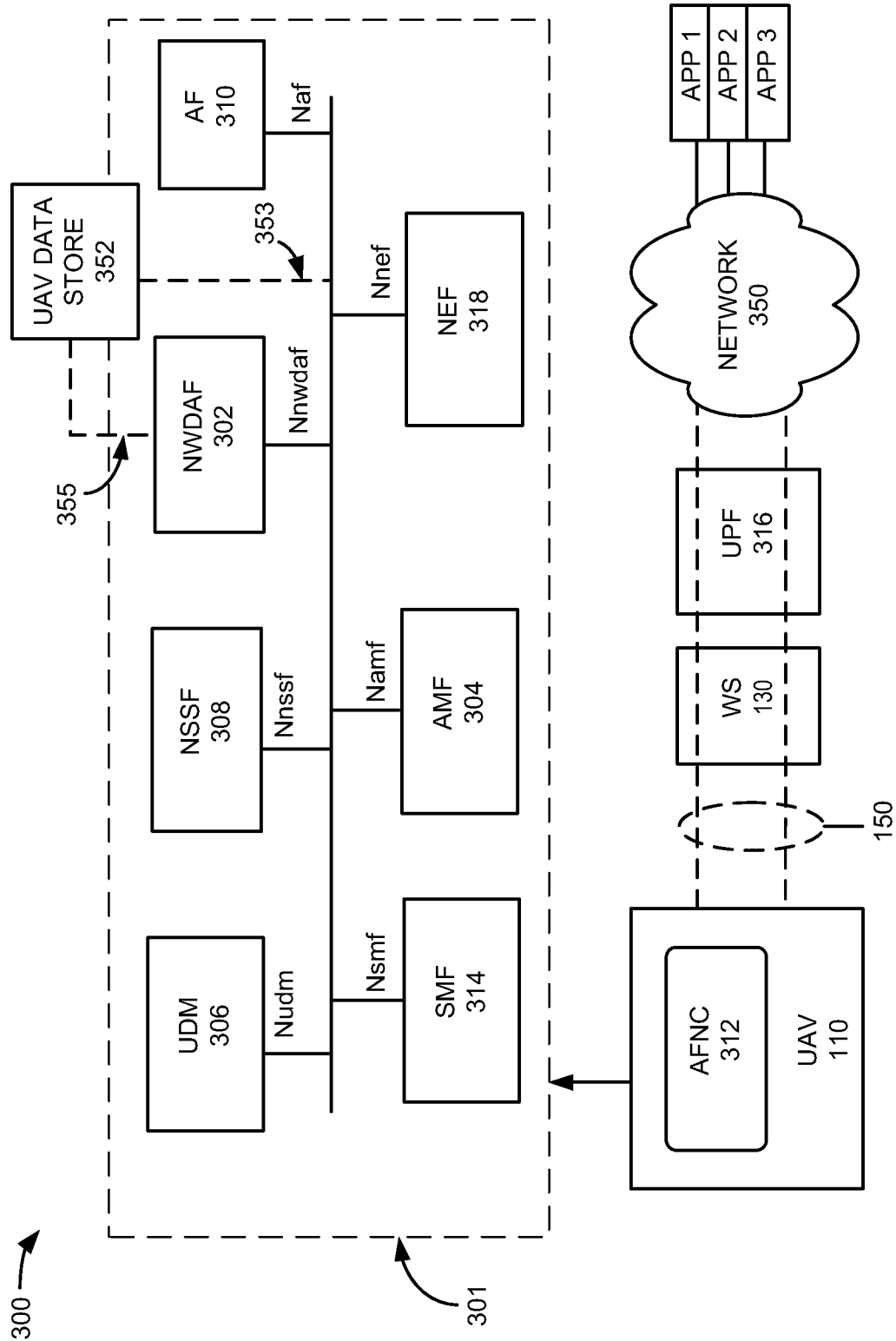
FIG. 3A is a diagram illustrating an example implementation associated with dynamic slice management.
Figure 3B:
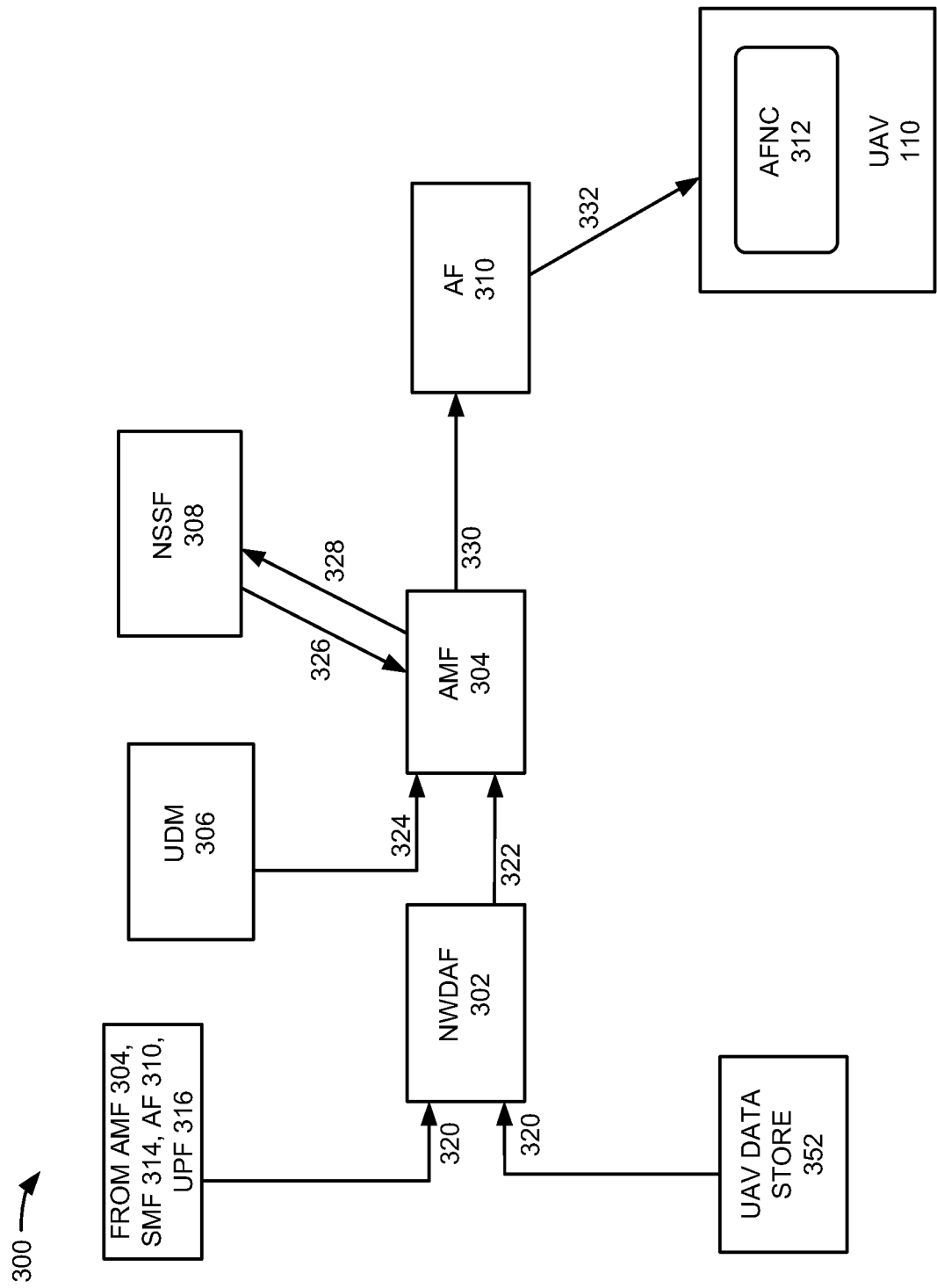
FIG. 3B is a diagram illustrating processing associated with dynamic slice management in accordance with an example implementation.

FIGS. 3A and 3B are diagrams illustrating an environment 300 for performing dynamic slice management for UAVs 110 within a 5G network. Example environment 300 may include UAV 110 and a number of 5G network functions and/or network function instances, such as one or more of a Network Data Analytics Function (NWDAF) 302, an Access and Mobility Management Function (AMF) 304, a Unified Data Manager (UDM) 306, a Network Slice Selection Function (NSSF) 308, an Application Function (AF) 310, a Session Management Function (SMF) 314, a User Plane Function (UPF) 316, and a Network Exposure Function (NEF) 318. Each network function may be implemented as one or more "instances" (e.g., equipment, virtual machines, containers, services) within one or more network elements 145 of provider network 140, which may be interconnected via one or more network connections. In some implementations, the network function instances may be implemented as part of a 5G Service-Based Architecture (SBA) 301 that allows each network function instance to communicate with any other network function instance to access the services provided by such network function instance (subject to various function discovery, access policies and the like). The 5G SBA 301 may provide for interfaces exposed by each network function and/or network function instance that allow for messaging between network functions/network function instances (shown in FIG. 3A) with designations "$N_{<networkfunctionname>}$". Messaging may take the form of service requests to a network function instance (with a possible response from the network function instance), and/or subscriptions to event notifications from the network function instance. UAV 110 may communicate through a wireless station 130 (such as a gNodeB) with one or more applications (as shown, APP1, APP2 and APP3) that may be available via one or more networks 350. Communication with each application may be through a UPF 316 and may use one or more network slices 150. UAV 110 may include an Application Function Notification Client (AFNC) 312 that allows for communication with AF 310 in order to receive messages related to dynamic slice management, as described herein.

As will be further discussed below, in the example implementation, NWDAF 302 may include logic that receives input related to UAV location and network service performance, performs analysis, and makes slice predictions based on the analysis. AMF 304 may use the predictions from NWDAF 302, as well as UAV slice subscription information (e.g., from UDM 306) and allowed slice information (e.g., from NSSF 308), to determine a set of "optimal" slices that a UAV 110 may select during a time period the UAV 110 is expected to be in a location. AF 310 may receive the expected UAV locations/timing and the set of slices and may notify UAV 110 (e.g., using AFNC 312) in order for UAV 110 to take action (such as execute certain applications and/or request access to certain slices).

In some embodiments, a UAV 110 may subscribe to the dynamic slice management service (e.g., the dynamic slice management capability may be indicated in the UAV subscription information stored in a subscription data store such as UDM 306). When the UAV 110 is operational, network function instances in environment 300 may obtain the subscription information, configure themselves and send messages (e.g., requests, responses, subscriptions, notifications, etc.) to other network function instances to enable the dynamic slice management capabilities described herein.

As shown in FIG. 3B, NWDAF 302 may receive one or more inputs 320. NWDAF 302 may receive inputs 320 from a number of sources, such as AMF 304, SMF 314, UPF 316, AF 310, external applications or systems, etc. For example, NWDAF 302 may receive mobility information associated with devices being serviced by provider network 140 from AMF 304 (which may include a device ID, device location/time, a type code for the device, etc.) and/or from AF 310 (which may include a device ID, a device location/time, an application ID, etc.). NWDAF 302 may also receive service experience information associated with the performance of the network, such as from AF 310 (which may include an application ID, a flow ID, a quality of experience measurement, a timestamp, etc.), and from AMF 304, SMF 314 and/or UPF 316 (which may include a device ID, an application ID, a flow ID, device location/time, packet throughput/delay measurements, etc.). NWDAF 302 may receive the aforementioned inputs by making requests using the SBA 301 to the network function instances described above, and/or via subscriptions with instances of AMF 304, SMF 314, AF 310 and/or UPF 316 for each to provide notifications using SBA 301 with the information described above.

In one implementation, NWDAF 302 inputs 320 may include information associated with a predicted flight path for UAV 110. For example, NWDAF 302 may receive flight path information associated with UAV 110 from an external UAV data store 352 (also referred to as UAV data source 352), such as a UAV management application or system (e.g., an Unmanned Aircraft System (UAS) Service Supplier (USS)). The UAV data store 352 may determine a flight path for UAV 110, and flight path information associated with the flight path may be communicated to NWDAF 302. NWDAF 302 may receive the flight path information for UAV 110 and may use the flight path information to determine the areas within access networks 120 in which UAV 110 will travel during the flight. For example, the NWDAF 302 may use information that maps geographic areas (such as may be provided as part of a flight path) to tracking areas or individuals cells within the access network 120. In some implementations, UAV data store 352 may be connected to SBA 301 (shown in FIG. 3A as dashed line 353), such that NWDAF 302 may obtain the flight path information via messages using SBA 301. Alternatively or additionally, UAV data store 352 may be connected directly to NWDAF 302 (shown in FIG. 3A as dashed line 355), such that NWDAF 302 may obtain the flight path information directly from UAV data store 352 without using SBA 301.

As described above, NWDAF 302 may receive inputs 320 from a number of sources, including flight path information from UAV data store 352. FIG. 3C illustrates an example of flight path information 360 that may be provided to NWDAF 302. In this example, a UAV data store 352 provides a message that includes flight plan and/or path information such as origination coordinates, origination time, flight altitudes, and coordinates for the expected flight path. In some implementations, more information may be included, such as expected speeds of travel. The example message is provided in JavaScript Object Notation format, but other formats may be used. In some implementations, the flight path information may be provided over time, such as the duration of a flight, and may provide updated information reflective of the actual flight path taken and/or updates to the expected flight path.

NWDAF 302 may use the flight path information 360 to determine tracking areas or cells that correspond to the flight path. For example, all or a portion of the flight path information (e.g., geographic coordinates associated with flight path locations) may be used to map the flight path to one or more tracking areas or cells within an access network 120. In some implementations, the mapping may be performed by the NEF 318. For example, the flight path information may be provided to the NEF 318 (e.g., as part of a service request using the SBA 301), and NEF 318 may provide NWDAF 302 with a response with the one or more tracking areas that map to the flight path information.

NWDAF 302 may use both mobility information associated with the UAV 110 and flight path information associated with the UAV 110 to predict the location (e.g., the tracking areas or cell(s)) in which UAV 110 will be present at a given time during a flight. For example, mobility information may be used to determine telemetry information (e.g., speed, direction) and flight path information may be used to determine a predicted time period during when UAV 110 will be present in a tracking area or cell. In some implementations, the flight path information may include expected telemetry information such as expected speed, and may be used without mobility information to determine the predicted tracking areas or cells and time periods.

NWDAF 302 may further include a capability to predict a service experience for applications using network slices. For example, the NWDAF 302 may use the service experience information to determine an expected service experience for a given application using a given network slice. Predictions may be according to an analytical model (e.g. a machine learning model), that uses the service experience information as inputs to generate outputs such as the slice ID (e.g., a Single-Network Slice Selection Assistance Information (S-NSSAI)) and Application ID to which the prediction is applicable, an area/time period during which the prediction is valid, and a probability/confidence measure.

The service experience capability may be applied to applications executed on UAV flights. For example, NWDAF 302 may be able to determine that a particular application being used by UAV 110 and using a particular slice 150 is expected to either maintain a service quality or is expected to degrade in service quality in one or more geographical locations along the flight path and/or one or more time periods during the flight. Likewise, NWDAF 302 may be used to predict optimal application/slice pairings for a UAV 110 to use for each geographic area and/or time period of its flight, based on predicted service experience.

For example, NWDAF 302 may receive input from various data sources to allow NWDAF 302 to predict slice/application pairs. For example, referring to FIG. 3B and as described above, NWDAF 302 may receive inputs and/or subscribe to notifications from UAV data store 352. NWDAF 302 may also receive inputs and/or subscribe to notifications from AMF 304, SMF 314, UPF 316, various AFs 310, etc. In one implementation, UAV data store 352 and/or a data lake (not shown) associated with monitoring environment 100 may maintain historical UAV flight data along with applications used by UAVs at particular locations and times during flights. UAV data store 352 may also store Quality of Service (QoS) parameters and/or other service experience parameters the UAVs 110 experience during the flights. UAV data store 352 may obtain such information from network functions/network function instances, such as AMF 304, SMF 314, UPF 316 and AFs 310. UAV data store 352 may store the information regarding QoS parameters and other service experience parameters for data analytics. For example, NWDAF 302 may use machine learning training models, and generate a machine learning model to predict slice/application pairs for future UAVs 110 in particular locations and/or at particular time periods based on information obtained from previous UAV flights. In one example, NWDAF 302 may determine that, when UAV 110 reaches the edge of a next geographic area (e.g., a network tracking area) in its flight path, different application/slice pairs will provide an optimal experience compared to an application and slice currently being used by UAV 110.

FIG. 4A illustrates as a table 400 some example proposed optimal application/slice pairs for UAV 110 that may be generated by NWDAF 302. Table 400 depicts NWDAF 302 outputs for a given time period (shown in Predicted Time Period column 402) and a given geographic area (shown in Predicted Location column 404) of a set of predicted optimal application/slice pairs (shown in Predicted Application/Slice Pair column 406). In the example shown in FIG. 4A, based on inputs 320, NWDAF 302 may determine that at time period 1, UAV 110 is predicted to be in a geographic area (in this example, a tracking area) with the tracking area identifier TAI-1, and the predicted optimal application/slice pairs at this location and time period are App-1/S-NSSAI-1 and App-2/S-NSSAI-2. The S-NSSAI may uniquely identify a network slice. As further shown in table 400, at time period 2, UAV 110 is predicted to be in area TAI-2 and the predicted optimal application/slice pairs at this time and location are App-3/S-NSSAI-3 and App-4/S-NSSAI-4.

Returning to FIG. 3B, AMF 304 may receive output 322 from NWDAF 302 including the optimal application/slice pairs for UAV 110 such as discussed above. For example, AMF 304 may, as part of the 5G SBA 301, subscribe to receive messages from NWDAF 302 associated with the dynamic slice management service (e.g., via a Nnwdaf_AnalyticsSubscription_Subscribe message to the Nnwdaf API of NWDAF 302) when the UAV 110 subscription information indicates that the UAV 110 is subscribed to the dynamic slice management service. AMF 304 may also receive additional inputs 324 from other network function instances, such as UDM 306 (e.g., through other subscribe/publish or request/response messaging). For example, in some implementations, AMF 304 may request from UDM 306, UAV subscription plan information, such as the identification of slices 150 to which UAV 110 has subscribed. UAV 110 may have subscribed to access particular slices 150 available as part of the environment 300, which may limit the slices to which UAV 110 may be provided access. The indication of subscribed slices may take the form of NSSAI information. In some implementations, AMF 304 may receive, from NSSF 308, an indication of currently "allowed" slices in a particular area. The allowed slices may be a set of slices that are available for use by a device in the network environment in a particular area. The indication of allowed slices may take the form of NSSAI information.

Using its inputs, AMF 304 may determine a set of allowed slices that a UAV 110 will be allowed to use. This set of allowed slices may be determined based on the predicted optimal slices provided by NWDAF 302, the subscribed slices for UAV 110, and the allowed slices available in a network area. In some implementations, AMF 304 may also instruct the NSSF 308 to make available additional slices where a predicted optimal slice is not initially indicated as allowed. FIG. 4B illustrates as a table 410 some examples of the methodology used by AMF 304 to generate the allowed slice set for use by a UAV 110. In the first example shown in table 410, AMF 304 may receive time period information (as shown in the Predicted Time Period column 412), geographic area information (as shown in the Predicted Location column 414) and predicted slice information (as shown in Predicted NSSAIs column 420). These "predicted" data may be provided by NWDAF 302, and may vary over the locations/times predicted for the UAV flight. For example, table 410 indicates that the predicted optimal slices will vary from slices S-NSSAI-1, S-NSSAI-2 and S-NSSAI-6 during Period 1 in area TAI-1, to slices S-NSSAI-4, S-NSSAI-6 and S-NSSAI-7 during Period 2 in area TAI-2, to slice S-NSSAI-5 during Period 3 in area TAI-3.

AMF 304 may also receive subscribed slice information (e.g., from UDM 306) indicating the slices to which UAV 110 has subscribed to use. In the example shown in table 410, UAV 110 has only subscribed to use slices S-NSSAI-1 to S-NSSAI-5 (as shown in the Subscribed NSSAIs column 416).

AMF 304 may also receive allowed slice information 326 (e.g., from NSSF 308) that indicates which slices are allowed to be used in a geographic area and/or a time period. In the example shown in table 410, during Period 1 in geographic area TAI-1, the allowed slices are S-NSSAI-1 and S-NSSAI-3, while during Period 2 in geographic area TAI-2, the allowed slices are S-NSSAI-1 and S-NSSAI-2, and during Period 3 in geographic area TAI-3, the allowed slices are S-NSSAI-1, S-NSSAI-2, S-NSSAI-3 and S-NSSAI-4 (as shown in the Current Allowed NSSAIs column 418).

AMF 304 may determine whether any of the members of the set of predicted slices are missing from the set of current allowed slices, and determine whether those missing slices (if any) are within the set of subscribed slices for UAV 110. This determination can then be used to request that the missing slices be enabled for the location/time at which the UAV is predicted to be present. Returning to the example of table 410, for Period 1, AMF 304 determines that of the predicted slices (S-NSSAI-1, S-NSSAI-2, and S-NSSAI-6), slices S-NSSAI-2 and S-NSSAI-6 are missing from the set of current allowed slices (S-NSSAI-1 and S-NSSAI-3). AMF 304 further determines that UAV 110 is only subscribed to slices S-NSSAI-1 through S-NSSAI-5 and is not subscribed to S-NSSAI-6, so of the slices missing from the set of allowed slices, UAV 110 is only allowed to use the slice S-NSSAI-2. For Period 2, AMF 304 determines that of the predicted slices (S-NSSAI-4, S-NSSAI-6, and S-NSSAI-7), all three slices are missing from the set of current allowed slices (S-NSSAI-1 and S-NSSAI-2). AMF 304 further determines that UAV 110 is only subscribed to slices S-NSSAI-1 through S-NSSAI-5 and is not subscribed to slices S-NSSAI-6 and S-NSSAI-7, so of the slices missing from the set of allowed slices, UAV 110 is only allowed to use the slice S-NSSAI-4. For Period 3, AMF 304 determines that the only predicted slice (S-NSSAI-5) is missing from the set of current allowed slices (S-NSSAI-1 through S-NSSAI-4). AMF 304 further determines that UAV 110 is only subscribed to slices S-NSSAI-1 through S-NSSAI-4 and is not subscribed to slice S-NSSAI-5, so none of the slices missing from the set of allowed slices is within the subscription for UAV 110, so no missing optimal slice is identified. These results are shown in table 410 in the Missing Optimal NSSAIs column 422.

AMF 304 may then request the NSSF 308 enable any missing slices (arrow 328 in FIG. 3B) so that they are included in the allowed slices for UAV 110. In some implementations, AMF 304 may send an indication of any missing slices (e.g., NSSAI information) to NSSF 308 in a message over the 5G SBA (e.g., a request using the Nnssf API). Alternatively or additionally, AMF 304 may send an indication of all the slices that should be made available to UAV 110—both the current allowed slices and the missing slices. In such an implementation, AMF 304 may determine a union set of the current allowed slices and the missing slices to form a set of "target" allowed slices. Returning to the example shown in table 410, the union of the current allowed slices is shown in the Target Allowed NSSAIs column 424. NSSF 308 may then update the current allowed slices such that the missing slice(s) are now included in the current allowed slices available for use by UAV 110.

In some implementations, AMF 304 may provide one or more event types that may be subscribed to for notifications related to the dynamic slice management capability. Accordingly, AMF 304 may generate an event notification (shown as arrow 330 in FIG. 3B) to subscribed network function instances when certain conditions/events occur in the dynamic slice management service. For example, AMF 304 may generate an event notification when it receives a predicted location/time for a UAV 110 and/or predicted optimal slice/application information for a UAV 110 (e.g., from NWDAF 302). In some embodiments, AMF 304 may generate an event notification when it transmits missing/target slices to NSSF 308. The event notification may include information associated with the predicted optimal applications and/or predicted optimal network slices, location information, time period information, and/or other information.

AF 310 may subscribe to the event types provided by AMF 304 related to the dynamic slice management capability. For example, AF 310 may receive the subscription information for UAV 110 that indicates that UAV 110 has subscribed to the dynamic slice management service, and may then subscribe to event notifications with AMF 304. When an event notification is received by AF 310, it may send a notification (shown as arrow 332 in FIG. 3B) to UAV 110 indicating the predicted optimal application/slice information, location information, time period information, and the like. In some implementations, notification 332 may include optimal application/slice information for multiple projected time periods/locations of the flight path of the UAV 110.

As described above, UAV 110 may include AFNC 312. AFNC 312 may receive notification 332 and may translate the notification into actions by the UAV 110 to activate/adjust/inactivate application usage and/or request slice usage. For example, if a notification 332 includes an indication that UAV 110 should run an application in a new slice when UAV 110 enters the next tracking area, AFNC 312 may cause the UAV 110 to request usage of the new slice with the application when UAV 110 enters the new tracking area, and may also cause the UAV 110 to adjust the configuration of its usage of the application in accordance with the slice characteristics (e.g., bandwidth capabilities). As another example, if a notification 332 includes an indication that a certain application is optimal when UAV 110 enters the next tracking area, AFNC 312 may determine if UAV 110 is currently using an application for which the optimal application should be substituted, and may cause the UAV 110 to end usage of the current application and start usage of the optimal application when UAV 110 enters the new tracking area. In some implementations, since AMF 304 has requested that NSSF 308 include any predicted optimal slices in the allowed slices for the new tracking area, the network may be prepared for UAV 110 to request and use the new slice when UAV 110 enters the new tracking area, and the UAV 110 obtains the benefit of an optimal experience for its use of applications while traversing the tracking area.

In some embodiments, AFNC 312 may maintain a data store of information received in notifications 332, so that as UAV 110 traverses its flight path, AFNC 312 may provide instruction to UAV 110 on optimal application/slice usage. For example, such a data store may store predicted locations, time periods and optimal application/slice pairings, and when UAV 110 enters (or is about to enter) a location, the optimal application/slice information may be retrieved and used to provide instruction to UAV 110 on optimal application/slice usage. Additionally, AFNC 312 may update the data store as new notifications 332 are received, which may contain more current information. For example, a notification 332 may indicate that a predicted optimal application/slice pair has changed for a location (e.g., due to changing conditions in network traffic, weather, etc.) or that the predicted location for UAV 110 has changed for a time period. AFNC 312 may then alter (e.g., overwrite, edit, deprioritize and the like) a prior information entry in favor of the information provided by the newer notification 332. AFNC 312 may also remove information from the data store once it has become stale, such as when a time period has passed.

Figure 5:
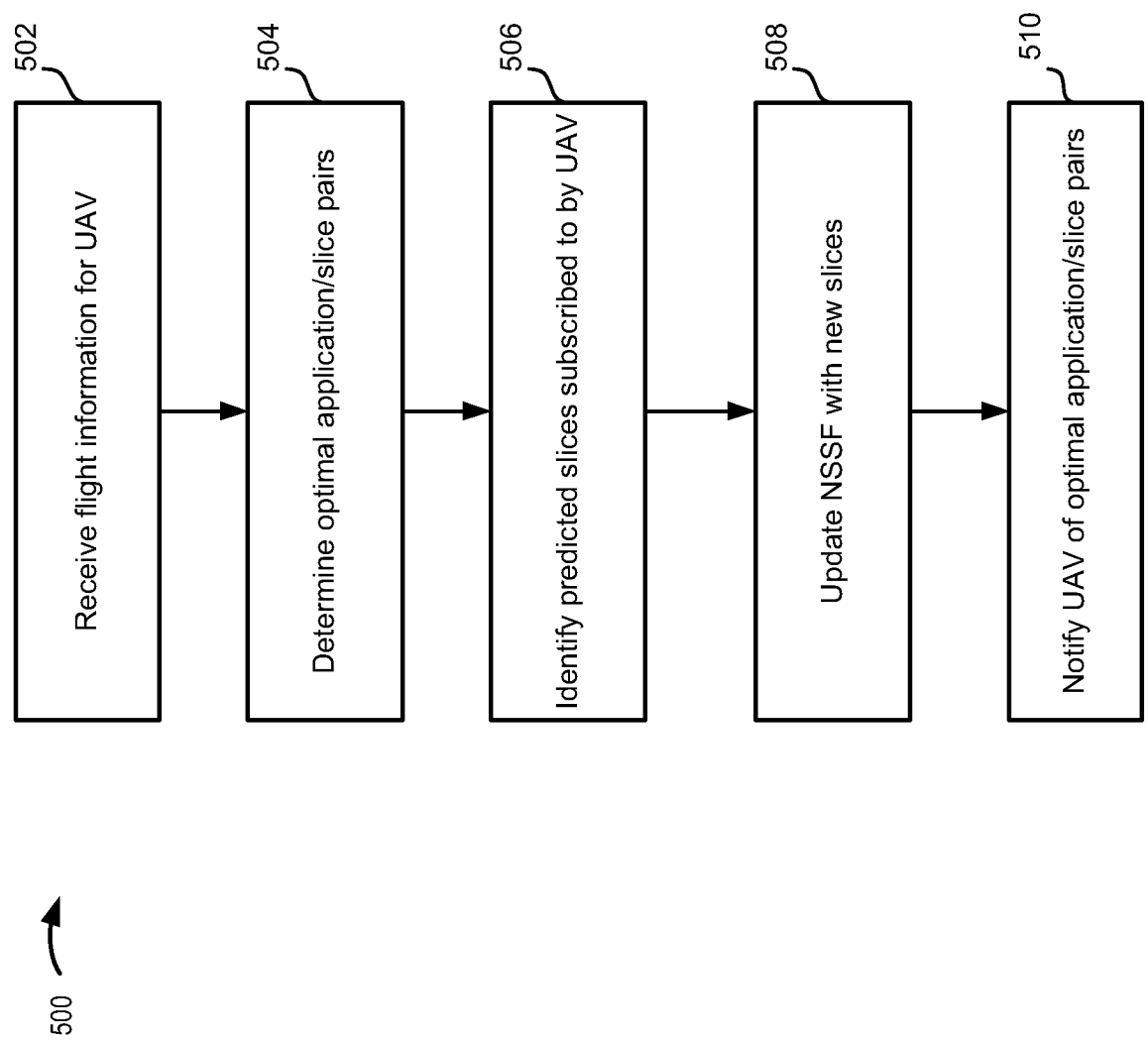
FIG. 5 is a flow diagram illustrating processing associated with dynamic slice management in accordance with an example implementation.

FIG. 5 is a flow diagram illustrating an example process 500 implementing dynamic slice management. The actions described with respect to process 500 may be performed by UAV 110, NWDAF 302, AMF 304, UDM 306, NSSF 308, AF 310, and/or additional elements of environment 300, as described herein.

Process 500 may include receiving flight information for UAV 110 (block 502). For example, NWDAF 302 may receive inputs from AMF 304, a UAV data store 352 and/or another component (such as described above) that includes information about a flight path or a predicted flight path of UAV 110. NWDAF 302 may also receive service experience information associated with network performance, such as described above. Based on the flight information, NWDAF 302 may determine optimal application/slice information for UAV 110 in different locations/times (block 504). For example, NWDAF 302 may determine one or more optimal application/slice pairings for one or more predicted locations/times in the expected flight path of UAV 110, such as described above.

Process 500 may include determining optimal allowed slices to which UAV 110 is subscribed (block 506). For example, AMF 304 may receive predicted optimal slices (e.g., from NWDAF 302), slices to which UAV 110 is subscribed (e.g., from UDM 306), and current allowed slices (e.g., from NSSF 308). AMF 304 may determine whether to request an update to the current allowed slices when the set of current allowed slices do not include one or more of the predicted optimal slices to which UAV 110 is subscribed, such as described above.

Process 500 may include requesting that the current allowed slices be updated to include any missing predicted optimal slices (block 508). For example, AMF 304 may request that NSSF 308 update the current allowed slices to include the missing predicted optimal slices.

Process 500 may include notifying UAV 110 of optimal application/slice information (block 510). For example, AMF 304 may notify AF 310 of predicted optimal application/slice information for UAV 110, and AF 310 may notify UAV 110 (e.g., using AFNC 312 on UAV 110) of the predicted optimal application/slice information. UAV 110 may then take action to adjust its use of applications and/or slices as it traverses the flight path locations. For example, when UAV 110 enters (or is about to enter) a new location, AFNC 312 may translate the information in a notification and may cause UAV 110 to adjust its usage of applications and/or slices. Process 500 (or sub-steps described herein) may be repeated periodically or on the occurrence of certain events as UAV 110 traverses its flight path. In this manner, UAV 110 may dynamically modify its use of network slices and/or applications to optimize the service experienced by UAV 110.

The foregoing description of implementations provides illustration and description, but is not intended to be exhaustive or to be limiting to only the form disclosed. Modifications and variations are possible in light of the above teachings and well-known techniques. For example, while a series of messages and series of operation flows or blocks have been described with regard to FIGS. 3A, 3B and 5, the order of messages and operation flows/blocks may be modified in other embodiments. Further, non-dependent operations may be performed in parallel, and individual operations may be grouped or decomposed into smaller actions for efficiency, resiliency, etc.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Use of the term "connect," "connected," "connection" or other derivatives is intended to describe a connection that allows two or more entities to communicate information, and may include permanent, semi-permanent or periodic physical (e.g., electrical, optical, radio frequency, and the like) connections, and may include connections that include intermediate devices and conduits (e.g., switches, routers, repeaters, amplifiers, transformers, translators, and the like).

Use of ordinal terms such as "first," "second," "third," etc., does not by itself connote any priority, precedence, or order of one item over another, the temporal order in which acts of a method are performed, the temporal order in which instructions executed by a device are performed, etc., but are used merely as labels to distinguish one element having a certain name from another element having a same name (but for use of the ordinal term).

As used herein, the article "a" is intended to include one or more items. Likewise, use of the phrase "a number of" is intended to indicate one or more items, whereas the terms "multiple" or "plurality" are intended to indicate two or more items. Use of the phrase "based on" is intended to mean "based, at least in part, on" unless explicitly stated otherwise.

No element, act, or instruction used in the description provided herein should be construed as critical or essential unless explicitly described as such.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. No claim element of a claim is to be construed under 35 U.S.C. § 112(f) unless the claim element expressly includes the phrase "means for" or "step for." All equivalents to the elements of the various aspects set forth in this description that are known or later come to be known are expressly incorporated herein by reference and are intended to be encompassed by the claims.

What is claimed is:

1. A method comprising:
    receiving flight path information associated with a flight path of an unmanned aerial vehicle (UAV);
    determining a predicted optimal network slice for use by the UAV at a location along the flight path, the predicted optimal network slice associated with an application that is available to the UAV; and
    transmitting information associated with the predicted optimal network slice to the UAV for use by the UAV at the location.

2. The method of claim 1, further comprising:
    determining whether the predicted optimal network slice is included in a set of allowed network slices;
    determining whether the predicted optimal network slice is included in a set of subscribed network slices of the UAV; and
    when the predicted optimal network slice is not included in the set of allowed network slices and is included in the set of subscribed network slices, transmitting an identifier associated with the predicted optimal network slice to a device to create a set of updated allowed network slices that includes the predicted optimal network slice.

3. The method of claim 2, wherein the device is an instance of a Network Slice Selection Function (NSSF).

4. The method of claim 1, wherein determining the predicted optimal network slice is performed by an instance of a Network Data and Analytics Function (NWDAF).

5. The method of claim 1, further comprising:
    receiving service experience information associated with network performance; and
    wherein determining the predicted optimal network slice includes using the service experience information and the flight path information to determine the predicted optimal network slice.

6. The method of claim 1, wherein the flight path information includes at least one of:
mobility information associated with the movement of the UAV and reported by a wireless network; and
telemetry information associated with the movement of the UAV and reported by a UAV data store.

7. The method of claim 1, wherein the flight path information includes predicted flight path information reflecting an expected future location of the UAV.

8. The method of claim 1, wherein determining the predicted optimal network slice includes determining predicted flight path information based on the flight path information, and using the predicted flight path information in determining the predicted optimal network slice.

9. A system comprising:
one or more processors to:
receive flight path information associated with a flight path of an unmanned aerial vehicle (UAV);
determine a predicted optimal network slice for use by the UAV at a location along the flight path, the predicted optimal network slice associated with an application that is available to the UAV; and
transmit information associated with the predicted optimal network slice to the UAV for use by the UAV at the location.

10. The system of claim 9, wherein the one or more processors are further configured to:
determine whether the predicted optimal network slice is included in a set of allowed network slices;
determine whether the predicted optimal network slice is included in a set of subscribed network slices of the UAV; and
when the predicted optimal network slice is not included in the set of allowed network slices and is included in the set of subscribed network slices, transmit an identifier associated with the predicted optimal network slice to a device to create a set of updated allowed network slices that includes the predicted optimal network slice.

11. The system of claim 10, wherein the device is an instance of a Network Slice Selection Function (NSSF).

12. The system of claim 9, wherein the one or more processors are associated with an instance of a Network Data and Analytics Function (NWDAF), and determining the predicted optimal network slice is performed by the NWDAF instance.

13. The system of claim 9, wherein the one or more processors are further configured to:
receive service experience information associated with network performance information;
wherein determining the predicted optimal network slice includes using the service experience information and the flight path information to determine the predicted optimal network slice.

14. The system of claim 9, wherein the flight path information includes at least one of:
mobility information associated with the movement of the UAV and reported by a wireless network; and
telemetry information associated with the movement of the UAV and reported by a UAV data store.

15. The system of claim 9, wherein the flight path information includes predicted flight path information reflecting an expected future location of the UAV.

16. The system of claim 9, wherein determining the predicted optimal network slice includes determining predicted flight path information based on the flight path information, and using the predicted flight path information in determining the predicted optimal network slice.

17. A system comprising:
a Network Data Analytics Function (NWDAF) instance;
an Access and Mobility Management Function (AMF) instance;
an Application Function (AF) instance; and
a Service Based Architecture (SBA) communicatively connecting the NWDAF instance, the
AMF instance and the AF instance, wherein
the NWDAF instance receives flight data information associated with a flight path of an unmanned aerial vehicle (UAV) and service experience information, determines a predicted optimal network slice at a location based on the flight data information and the service experience information, and provides a NWDAF message to the AMF instance using the SBA and including the predicted optimal network slice,
the AMF instance receives the NWDAF message, receives information for a set of subscribed slices for the UAV, and when the predicted optimal network slice is in the set of subscribed slices, provides a first AMF message to the AF instance using the SBA and including the predicted optimal network slice, and
the AF instance receives the first AMF message and provides an AF message to the UAV of the predicted optimal network slice.

18. The system of claim 17, further comprising:
a Network Slice Selection Function (NSSF) instance communicatively connected to the SBA;
wherein
the AMF instance receives information for a set of allowed network slices from the NSSF instance, determines whether the predicted optimal network slice is included in the set of allowed network slices, and when the predicted optimal network slice is not included in the set of allowed network slices and is included in the set of subscribed network slices, transmits a second AMF message to the NSSF instance using the SBA that includes an identifier associated with the predicted optimal network slice, and
the NSSF instance receives the second AMF message and generates a set of updated allowed network slices that includes the predicted optimal network slice.

19. The system of claim 17, wherein the location corresponds to a tracking area of a wireless network.

20. The system of claim 17, wherein the NWDAF message and the first AMF message each take the form of one of:
an event notification based on a prior subscription to receive notifications for events, or a request.

* * * * *